March 3, 1953 — M. WANIEWSKI ET AL — 2,630,098
POULT FEEDER
Filed May 18, 1951
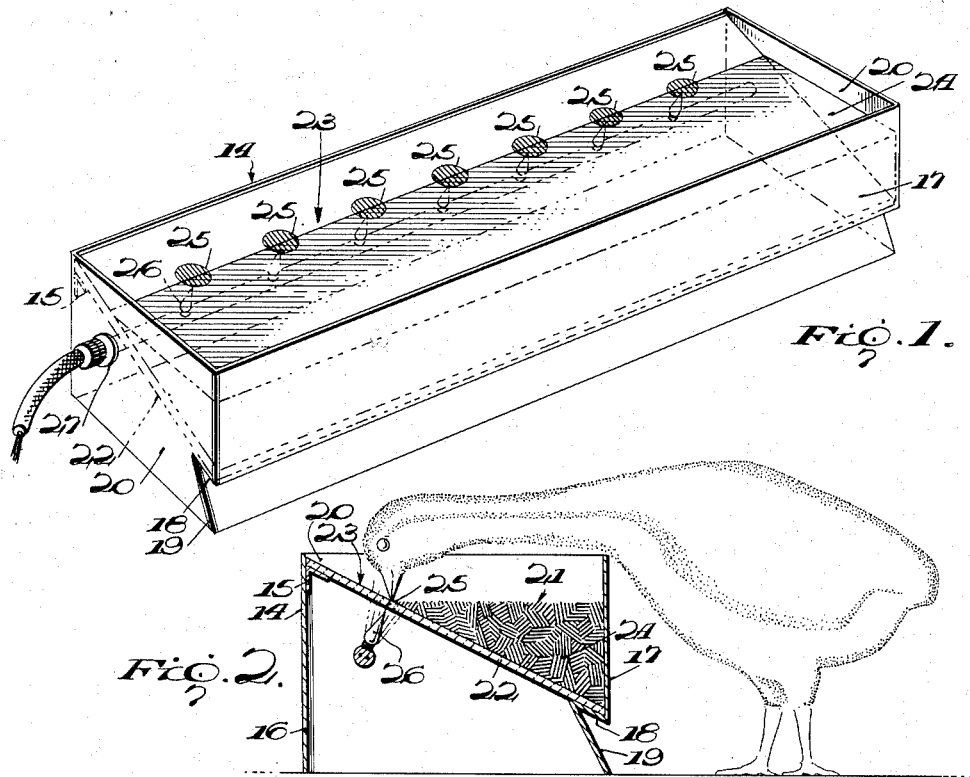
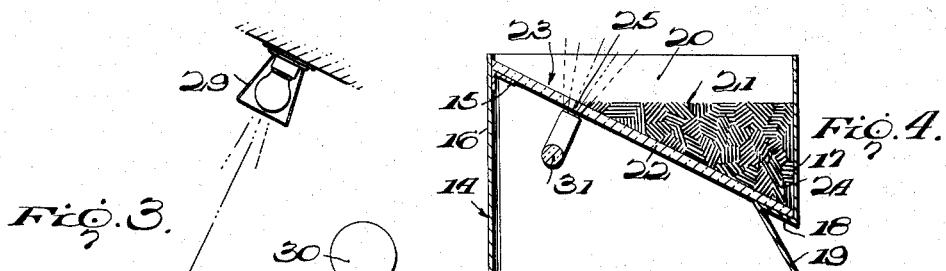
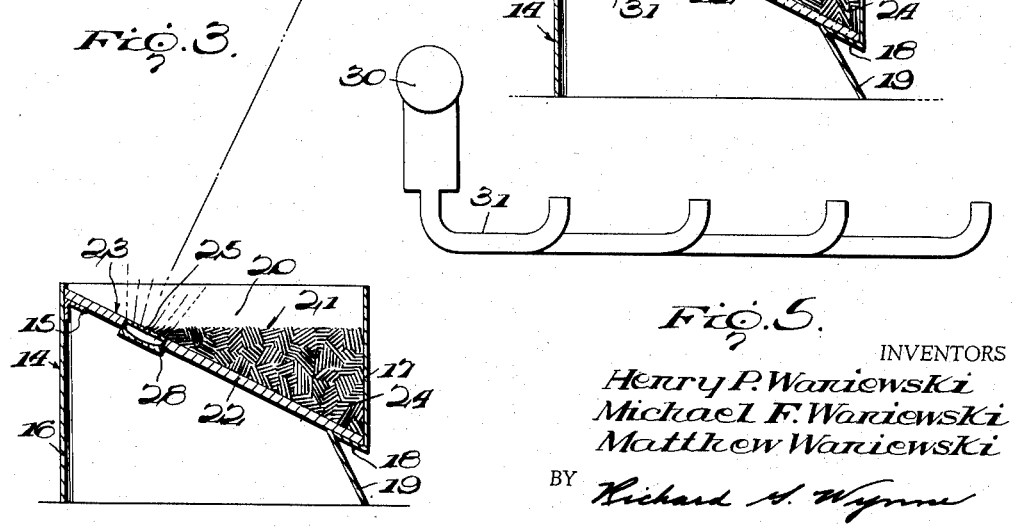
INVENTORS
Henry P. Waniewski
Michael F. Waniewski
Matthew Waniewski
BY Richard A. Wynne
ATTORNEY Patented Mar. 3, 1953

2,630,098

UNITED STATES PATENT OFFICE 2,630,098

POULT FEEDER

Matthew Waniewski, Feeding Hills, Mass., Michael F. Waniewski, Somersville, Conn., and Henry P. Waniewski, Chicopee, Mass.

Application May 18, 1951, Serial No. 226,992

1 Claim. (Cl. 119—61)

Our invention relates to a poult feeder which is particularly adapted for the stimulation of the feeding instinct of a poult immediately upon hatching and the development of healthy feeding habits during the early stages of growth.

That an unfilled need for our invention has existed for some time is especially evident from an investigation of the turkey industry of today which is expanding rapidly. The records show that in 1920 between 3,000,000 to 4,000,000 turkeys were raised while in 1945 between 44,000,000 to 45,000,000 turkeys were raised. Further evidence of this growth is shown by the annual gross income in the United States from turkeys which is presently between $260,000,000 to $275,000,000.

It will be readily appreciated that the breeding costs, incubation costs, and the brooding costs are substantial and command a large portion of the gross income above referred to. That losses in this initial phase of turkey raising be reduced to an absolute minimum is therefore mandatory, since in the final analysis the turkey raiser's profit is a direct function of his ability to avoid damaging losses to his initial investment.

The turkey industry today is plagued with extremely high losses of poults due to starvation immediately after hatching and sickness directly flowing from very limited nourishment. Extensive research has shown that poults must eat a substantial amount of feed within twenty-four hours after hatching for otherwise the health of the poult is seriously injured and death to large numbers results.

Under present day turkey raising techniques whereby upwards of 60,000 poults are raised annually on a single farm and in an environment completely foreign to their natural habitat, the problem of stimulating the feeding instinct of poults has become one of paramount importance. Considerable research and expense in the past has failed to produce a means for exciting the inherent natural instincts of the poults into proper feeding habits so necessary for healthy and rapid growth. Until our invention, losses of poults averaged about 7%. Higher loss percentages were, of course, sustained by some turkey raisers with the previously unavoidable end result of financial failure.

Use of our invention by the turkey industry has resulted in a reduction of poult starvation losses from about 7% to about 1%. In one instance, the loss was less than one percent, the actual figure being 0.75%.

It will be readily appreciated that the reduction in losses of poults from about 7% to about 1% results in a tremendous financial advantage since it completely eliminates the previously unavoidable loss of about 6%. Through our invention the poults and especially the newly-hatched poults are enticed into proper feeding habits thereby reducing the starvation losses to a minimum. By substantially eliminating the starvation losses of the poults and insuring the healthy feeding habits of the poults, our invention greatly facilitates the raising of a healthy flock capable of resisting the many diseases which kill the poults or mar them in such a manner that their marketability is reduced considerably. In this regard, it is important to appreciate that our invention not only insures the life of the young poults, but also provides the foundation for the growth of healthy birds which is all important since a deformed or diseased bird is in the financial picture considered worse than a dead bird.

We accomplish these features of our invention by the provision of a feeder uniquely adapted for stimulating the instinctive sense of self preservation through the provision of a particular stimuli discovered to be amazingly effective, namely, a green luminous portion. Immediately upon response to this stimuli, the beak of the poult is directed by an inclined feed support from a sense organ stimulation zone into a feed containing zone where a portion of feed is received by the poult. In practice it has been found that the poults appear to enjoy this procedure and continue to peck at the green luminous portion for a considerable period of time. This reaction is particularly noticeable with newly-hatched poults and is highly desirable as it causes them to eat during the very critical twenty-four hour period after hatching. Further, our invention establishes excellent eating habits which decidedly increase the grain consumption of each poult resulting in rapid growth and early maturity and the early establishment of a healthy condition highly resistant to deformities and diseases.

The various objects and features of our invention will be fully understood from the following detailed description of typical forms and applications of our invention, throughout which description reference is made to the accompanying drawing in which:

Fig. 1 is a perspective view of our poult feeder;

Fig. 2 is a transverse cross-sectional side view of a feeder shown in Fig. 1 and showing a poult picking thereat;

Fig. 3 is a transverse cross-sectional side view of a feeder utilizing a distant light source and a light reflector;

Fig. 4 is a transverse cross-sectional side view of a feeder utilizing a plastic material for conducting the light to the feeder; and Fig. 5 is a view of the plastic element and light source used in Fig. 4.

As seen in Figs. 1 and 2, our invention comprises a frame 14 which includes a feed support angle bracket 15 on the plate 16 and a trough plate 17 which is designed to prevent feed spillage. The trough plate 17 is bent inwardly and upwardly to form a feed support platform 18 and from thence it is bent downwardly to form a surface engaging member 19. Suitable sidewalls 20 are provided to form a lower feed containing zone 21. The feed support 22 is mounted on the bracket 15 and the platform 18 at an angle to the horizontal to provide an upper sense organ stimulation zone 23 as well as the immediately adjacent lower feed containing zone 21. The inclined feed support 22 is designed to direct the beak of a poult downwardly into the feed 24 when the poult pecks at the upper sense organ stimulation zone 23.

This desired pecking of the poult and especially the newly hatched poult is stimulated by the provision of at least one and preferably a plurality of green luminous portions 25 visible at the sense organ stimulation zone 23, these green luminous portions 25 being areas which are full of light or which emit light.

As shown in Fig. 1 this is accomplished by the provision of a feed support 22 of a material suitable for the passage of green rays of light. This material may be transparent, that is, having the property of transmitting rays of light so that bodies may be seen therethrough or it may be translucent, that is, partly transparent and admitting passage of light, but diffusing it so that objects cannot be clearly distinguished therethrough. Glass and plastic have been found to be suitable materials.

The green hue of the luminous portions 25 in Figs. 1 and 2 may be obtained by the utilization of a green feed support 22 and/or a green illuminating means 26. As seen in Figs. 1 and 2 the illuminating means 26 is in the form of spaced light bulbs extending the length of the feed support 22 immediately under the sense organ stimulation zone 23. A suitable electrical connector 27 is provided in the sidewall 20.

Referring now to Fig. 3 it will be seen that the frame 14 is similar to that shown in Figs. 1 and 2, but that the feed support 22 is provided with a plurality of light reflectors 28 which are mounted therein. A distant light source 29 provides the means for illuminating the reflectors 28. The green hue of the luminous portions 25 produced by the reflectors 28 may be obtained by the utilization of green reflectors 28 and/or a green light source 29.

The modification shown in Figs. 4 and 5 utilizes a plastic material, namely, a methyl methacrylate polymer, which has the property of bending rays of light in a manner such that light may be conducted to the areas desired. A light source 30 supplies the necessary illumination from a point which may be at a distance from the feeder and the rays of light are conducted through the plastic conductor 31 to the spaced green luminous portions 25.

The feeders shown in Figs. 3 and 4 may be provided with green luminous portions 25 without the sometimes dangerous presence of electrical wiring in the feeder structure.

It will be understood that the poult feeder may be equipped with the usual guards to prevent contamination of the feed by poult droppings.

In use it has been discovered that the poults and especially the newly hatched poults peck enthusiastically at the sense organ stimulation zone for extended periods. Due to the slant of the feed support 22 the poult's beak is directed at each peck downwardly into the feed 24 where it is filled with a portion of feed. It will be readily appreciated that this early and apparently pleasant introduction to man-produced feed aids greatly in directing the natural feeding instincts of the poult into healthy eating habits of our present day feeds.

While we have described a typical preferred form and application of our invention, we do not wish to be limited or restricted to the specific details herein set forth, but wish to cover all changes and modifications which do not constitute departures from the spirit and scope of the invention.

We claim:

A poult feeder comprising a frame; a single, flat feed support mounted on said frame at an angle to the horizontal to provide a lower feed containing zone and an upper sense organ stimulation zone, said feed support being at least partly transparent and of a material suitable for the passage of the green rays of light; and means for producing a plurality of green luminous portions visible at said sense organ stimulation zone and at the thin edge portion of feed in said feed containing zone immediately adjacent said sense organ stimulation zone including a plurality of light emitters mounted on said frame immediately under said feed support at the sense organ stimulation zone, said feed containing zone being immediately adjacent said sense organ stimulation zone thereby to receive the beak of a poult as it slides downwardly subsequent to pecking at one of said green luminous portions.

MATTHEW WANIEWSKI.
MICHAEL F. WANIEWSKI.
HENRY P. WANIEWSKI.

REFERENCES CITED

The following references are of record in the file of this patent:

UNITED STATES PATENTS

| Number | Name | Date |
|---|---|---|
| 1,793,431 | Pelmulder | Feb. 17, 1931 |
| 2,448,707 | Erickson et al. | Sept. 7, 1948 |
| 2,463,704 | Lloyd et al. | Mar. 8, 1949 |
| 2,583,874 | Niemann | Jan. 29, 1952 |
| 2,585,400 | Morton | Feb. 12, 1952 |